UNITED STATES PATENT OFFICE.

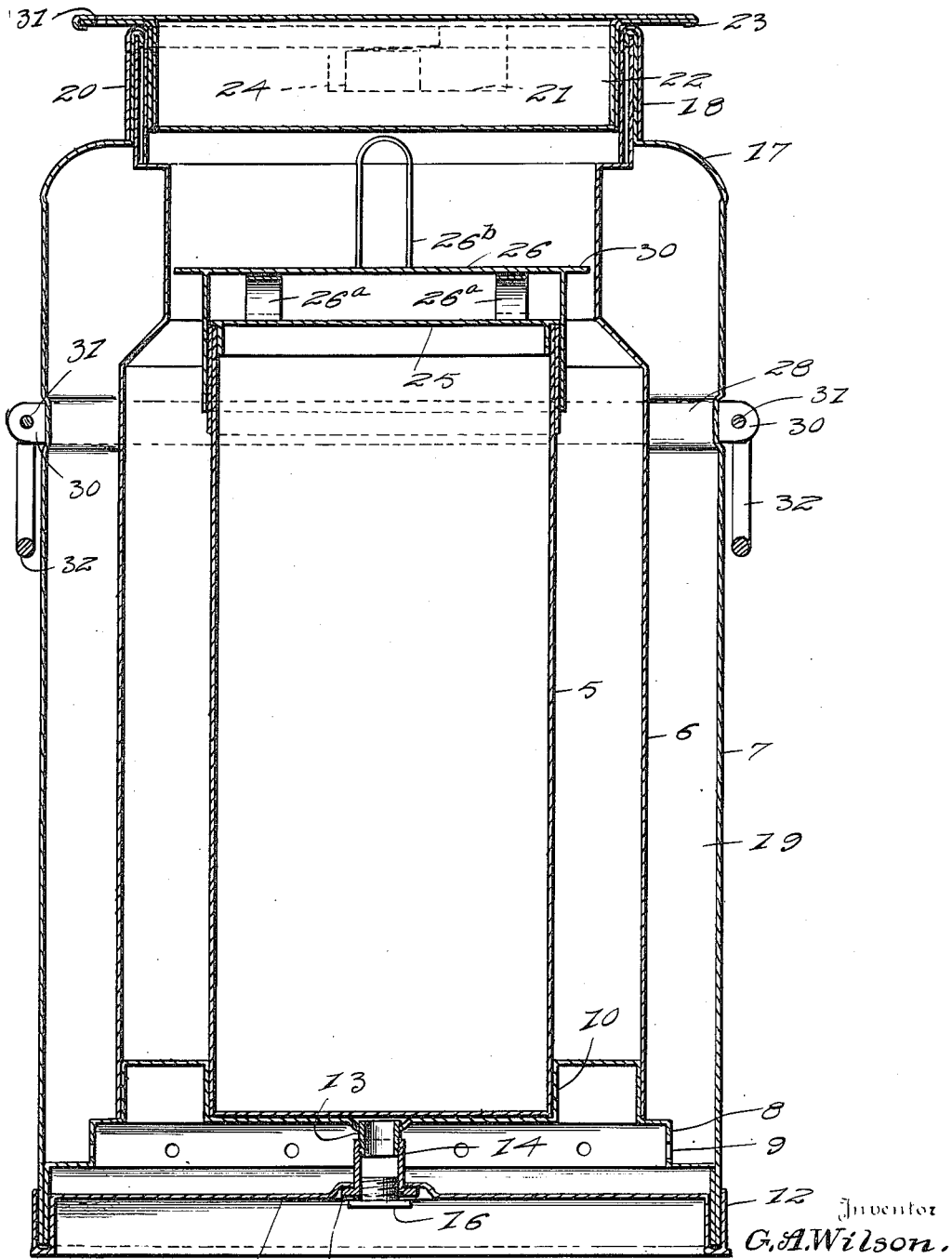

GEORGE A. WILSON, OF CHASE MILLS, NEW YORK, ASSIGNOR OF FIFTY-ONE ONE-HUNDREDTHS TO FRANCIS R. MARTIN, OF LOUISVILLE, NEW YORK, AND FRED J. FLANAGAN, OF NORFOLK, NEW YORK.

ICE-CREAM CAN.

1,303,751.    Specification of Letters Patent.    Patented May 13, 1919.

Application filed May 11, 1916, Serial No. 96,882. Renewed February 26, 1919. Serial No. 279,416.

*To all whom it may concern:*

Be it known that I, GEORGE A. WILSON, a citizen of the United States, residing at Chase Mills, in the county of St. Lawrence and State of New York, have invented certain new and useful Improvements in Ice-Cream Cans; and I do hereby declare the following to be a full, clear, and exact description of the invention, such as will enable others skilled in the art to which it appertains to make and use the same.

This invention has for its object to provide an efficient and inexpensive can primarily designed for shipping ice cream and which shall be sanitary.

Another object is the provision of a can embodying means whereby the contents thereof may be kept in a frozen condition during transportation.

With these and other objects in view, the invention consists in the novel construction, combination and arrangement of parts as will be hereinafter specifically described, claimed and illustrated in the accompanying drawings, in which:

The figure represents a longitudinal sectional view of the can as made in accordance with my invention.

Referring to the drawing in detail, wherein similar reference numerals designate corresponding parts throughout the several views, the numeral 5 indicates the seamless ice cream can, which is preferably of cylindrical construction, coated internally with white enamel and removably mounted in a double walled casing, which includes the inner and outer walls 6 and 7, respectively. The lower end of the inner wall 6 terminates in a plane above the outer wall 7 and is connected therewith by a horizontal partition 8, having a plurality of openings 9 therethrough and a central depressed portion 10 providing a seat for the lower end of the can 5, whereby the latter is retained in concentrically spaced relation to the inner casing wall 6. The bottom 11 is provided with a substantially U-shaped and laterally projecting flange 12, which embraces the contiguous portions of the outer casing wall 7 and the partition 8 and is soldered or otherwise rigidly connected therewith to provide an airtight joint. A tubular member 13 is secured in an aperture formed in the depressed portion 10 of the partition and is threaded into a sleeve 14, which projects through the bottom 11 and is provided with a sealing flange 15, engaging the bottom surface of the bottom 11 and removably receiving a plug 16, adapted to facilitate drainage of the contents of the casing of the milk can.

The upper end of the outer wall 7 is provided with a breast 17, which connects with a restricted neck portion 18, the upper edge of which is turned downwardly over the upper terminal of the inner wall 6, thereby providing an airtight chamber 19 between the inner and outer walls of the casing. A collar 20, which is substantially U-shaped in cross section, is slipped over the upper portions of the inner and outer casing walls and is rigidly secured thereto, the collar and inner and outer walls being provided at diametrically opposed points with internal depressions providing bayonet grooves 21.

A hollow airtight cap 22 is removably fitted in the neck of the casing formed by the collar 20 and is provided with a flange 23 constituting a handle for facilitating removal and application of the cover. The cover 22 is formed with enlargements or bosses 24 adapted to engage in the bayonet grooves 21 to lock the cover in closed position.

A cover 25 is fitted within the upper open end of the ice cream can 5 and is provided with handles 26ª, and a second cover or cap 26 is fitted over the open end of the can 5 outwardly of the cover 25 and is provided with handles 26ᵇ.

The outer casing wall 7 is formed with a circumferential depression 28 in which is fitted a band consisting of two sections 29, having apertured ears 30 at their adjacent ends receiving bolts or rivets 31 pivotally securing handles 32 to the band. The band sections 29 constitute a support for the handles 32 and also provide a reinforcement for the upper open end of the outer casing wall 7.

In use, the inner can 5 is filled with ice cream, or any other material, and prior to applying the cap 26, the space between the can 5 and the inner casing wall 6 is filled with cracked ice to retain the contents of the can in a frozen condition. The cap 26 is subsequently applied to the can 5 and the space between the cap 26 and the cover 22 is filled with cracked ice which is prevented from dropping down between the can 5 and the adjacent wall 6 by an outwardly directed flange 30 carried by the cap 26. The main cover 22 of the can is subsequently applied to the neck of the casing and is turned so as to engage the bosses 24 in the lower angular ends of the bayonet grooves 21. The flange 23 of the cover is preferably formed with openings 31 adapted to receive a seal, which may be connected with one of the handles 32 to insure against tampering with the cover of the can during transportation. The air in the chamber 19 and in the space between the partition 8 and the bottom 11 is preferably exhausted to produce a vacuum which will best insulate the inner can 5 from heat. After the can has arrived at its destination the water resulting from the melting of the ice contained in the casing is drained by removing the plug 15.

What I claim is:

1. An ice cream can including a casing having spaced walls, a partition connecting the lower ends of the walls and having a plurality of openings, said partition provided with a central depressed portion forming a seat, a cream containing can supported upon said seat, a bottom substantially U-shaped in cross section secured to the lower edge of the partition and outer wall of the casing, a tubular member secured to the depressed portion of the partition centrally thereof, a sleeve projecting through the bottom and in alinement with the tubular member of the bottom of the partition, a plug removably fitted in the sleeve, and means for closing the upper end of the casing.

2. An ice cream can including casing having inner and outer spaced walls and the inner wall terminating in a plane above the outer wall, a horizontal partition provided with a plurality of openings connecting the lower ends of the walls together, the central portion of the partition being depressed to form a seat for an inner can, a cover for the inner can, said inner can being of a diameter smaller than the inner wall to provde an ice compartment, a cover removably secured to and over the cover of the can for forming a chamber above the can, a bottom closing the lower ends of the outer wall and partition, means for establishing a communication between the bottom of the partition and the last named bottom, and a cover removably secured on the upper end of the outer wall.

3. An ice cream can including a casing having inner and outer walls, the inner wall terminating in a plane above the outer wall at the lower end thereof, a horizontal partition connecting the lower ends of the walls together, said partition provided centrally with a depressed portion forming an inner can seat, a can removably arranged in the seat and concentrically related thereto and in spaced relation to the inner wall forming an ice chamber, a cover for the inner can, a second cover carried by said inner can and having a flange overlying the can at its peripheral edge and terminating in close proximity to the inner wall to provide a chamber above said second cover, said second cover preventing the ice from going down to and between the inner wall and can, and a cover removably fitted in the upper end of the walls.

In testimony whereof I affix my signature in presence of two witnesses.

GEORGE A. WILSON.

Witnesses:
Amos E. Curry,
Fred J. Flanagan.